US008596063B2

(12) United States Patent
Brown et al.

(10) Patent No.: US 8,596,063 B2
(45) Date of Patent: Dec. 3, 2013

(54) EXHAUST TREATMENT SYSTEM FOR AN INTERNAL COMBUSTION ENGINE

(75) Inventors: David B. Brown, Brighton, MI (US); Shuguang Lu, Troy, MI (US); Jong H. Lee, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1123 days.

(21) Appl. No.: 12/487,175

(22) Filed: Jun. 18, 2009

(65) Prior Publication Data

US 2010/0319342 A1 Dec. 23, 2010

(51) Int. Cl.
*F02B 33/44* (2006.01)
*F01N 3/00* (2006.01)

(52) U.S. Cl.
USPC ............... 60/605.1; 60/274; 60/282; 60/295

(58) Field of Classification Search
USPC ............ 60/606, 605.2, 286, 282, 295, 605.1, 60/274
See application file for complete search history.

(56) References Cited

U.S. PATENT DOCUMENTS

| 5,116,579 A | * | 5/1992 | Kobayashi et al. ............ 60/280 |
| 5,753,188 A | * | 5/1998 | Shimoda et al. ............... 60/286 |
| 8,096,125 B2 | * | 1/2012 | Hepburn et al. ............ 60/605.2 |
| 2003/0115859 A1 | * | 6/2003 | Deeba ............................. 60/297 |
| 2006/0080953 A1 | * | 4/2006 | Maus et al. ..................... 60/286 |
| 2008/0034739 A1 | * | 2/2008 | Ranalli ............................ 60/295 |
| 2008/0041052 A1 | * | 2/2008 | Doring et al. ............... 60/605.1 |
| 2008/0066453 A1 | * | 3/2008 | Oberski et al. ................. 60/286 |
| 2008/0112865 A1 | * | 5/2008 | Alward et al. ............... 423/212 |
| 2010/0111791 A1 | * | 5/2010 | Caudle ....................... 423/213.5 |

FOREIGN PATENT DOCUMENTS

| CN | 1394686 A | 2/2003 |
| CN | 1936286 A | 3/2007 |
| JP | 2008180205 A | 8/2008 |
| JP | 2009114934 A | * 5/2009 |

* cited by examiner

*Primary Examiner* — Mary A Davis
(74) *Attorney, Agent, or Firm* — Cantor Colburn LLP

(57) ABSTRACT

A reductant delivery system for an exhaust treatment system of an internal combustion engine is disclosed. The system includes a turbocharger fluidly coupled to, and configured to receive exhaust gas from, the internal combustion engine. An exhaust gas driven turbine wheel is disposed for rotation in a turbine housing of the turbocharger. A reductant injection device is fluid communication with the exhaust gas driven turbine wheel, a reductant tank having a reductant stored therein and a conduit system fluidly connecting the reductant tank with the reductant injection device. Reductant is delivered to the reductant injection device for delivery of the reductant to the exhaust gas driven turbine wheel.

20 Claims, 3 Drawing Sheets

EXHAUST TREATMENT SYSTEM FOR AN INTERNAL COMBUSTION ENGINE

FIELD OF THE INVENTION

Exemplary embodiments of the present invention are related to exhaust treatment systems for internal combustion engines and, more specifically, to a compact system for efficient introduction of a reactant into the exhaust gas.

BACKGROUND

Exhaust gas aftertreatment systems for application to automotive internal combustion engines reduce or convert regulated constituents such as carbon monoxide ("CO"), unburned hydrocarbons ("HC") oxides of nitrogen ("$NO_x$") and, in the case of diesel engines, condensed phase materials (liquids and solids) which constitute particulate matter. With increasingly stringent emission regulation, these exhaust gas aftertreatment systems have become increasingly complex in size, number of components and cost. Existing aftertreatment systems typically utilize individual components each having a discrete function. The components must be arranged in a particular configuration, and with a particular spacing or separation, in order to achieve functional goals. In addition, the introduction of reactants into the exhaust gas may be necessary to promote the reduction and/or oxidation of certain exhaust gas components. The size of the individual components and the packaging within varying vehicle architectures can be a difficult, costly undertaking.

As an example, one $NO_x$ abatement technology that is being developed for automotive applications is Selective Catalytic Reduction ("SCR") in which $NO_x$ is reduced with the aid of an ammonia reductant to nitrogen ("$N_2$") over a catalyst that is typically comprised of zeolite and various base metals. The zeolite/base metal catalyst is disposed on a support structure such as a flow through ceramic or metal monolith. For such applications, urea (typically present in an aqueous solution) or gaseous $NH_3$ is commonly used as the source of the ammonia reductant. The ammonia based reductant is preferably injected far enough upstream of the catalyzed support structure for uniform mixing in the exhaust gas stream. A uniform distribution of reductant with the exhaust gas is necessary to achieve optimal performance of the SCR system. In some cases, various mixing apparatus are installed in the exhaust conduit, upstream of the catalyzed support, to aid in proper mixing of the reductant and the exhaust gas when sufficient flow distance is unavailable. Such mixing apparatus is not particularly desirable in that it is costly, complex and may impact the efficiency of the overall exhaust system.

Additionally, the space required for adequate mixing of a reactant into the exhaust gas stream prevents the placement of the catalyst device in a close mounted configuration in which the catalyzed support is located at or very near to the exhaust outlet of the engine. Such mounting methods may be desirable in that they provide for rapid heat-up and activation, or light-off, of the catalytic device following an engine cold-start, as well as improving the temperature at which the device operates which, with some catalyst compositions, may improve performance.

Accordingly, it is desirable to provide an apparatus that will achieve uniform mixing and distribution of a reactant injected into the exhaust system of an internal combustion engine in an efficient and compact manner.

SUMMARY OF THE INVENTION

In one exemplary embodiment of the present invention, a reductant delivery system for an exhaust treatment system of an internal combustion engine is provided comprising a turbocharger fluidly coupled to, and configured to receive exhaust gas from, the internal combustion engine. An exhaust gas driven turbine wheel is disposed for rotation in a turbine housing of the turbocharger. A reductant injection device is in fluid communication with the exhaust gas driven turbine wheel. A conduit system fluidly connects the reductant injection device with a reductant storage tank for delivery of reductant to the reductant injection device and to the exhaust gas driven turbine wheel.

In another exemplary embodiment of the present invention, an exhaust treatment system for an internal combustion engine comprises an exhaust manifold configured to collect exhaust gas from the internal combustion engine and a turbocharger fluidly coupled to the exhaust manifold and configured to receive the exhaust gas. The turbocharger includes an exhaust gas driven turbine wheel disposed for rotation in a turbine housing of the turbocharger. An exhaust treatment device is located downstream of, and in fluid communication with, the turbocharger and is configured to receive the exhaust gas and to convert or reduce constituents of the exhaust gas therein. A reductant injection system is in fluid communication with the exhaust treatment system and is configured to inject a reductant into the exhaust gas at a location in the exhaust treatment system upstream of the turbine wheel. The turbine wheel is configured to mix the reductant with the exhaust gas for delivery to the exhaust treatment device.

In yet another exemplary embodiment of the present invention a method for the reduction or conversion of exhaust gas constituents of an internal combustion engine comprises collecting exhaust gas in an exhaust manifold, delivering the exhaust gas to a turbocharger having an exhaust gas driven turbine wheel disposed for rotation in a turbine housing of the turbocharger, selecting an exhaust treatment device, locating the exhaust treatment device downstream of, and in fluid communication with, the turbocharger and locating a reductant delivery device in fluid communication with the turbine wheel of the turbocharger.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
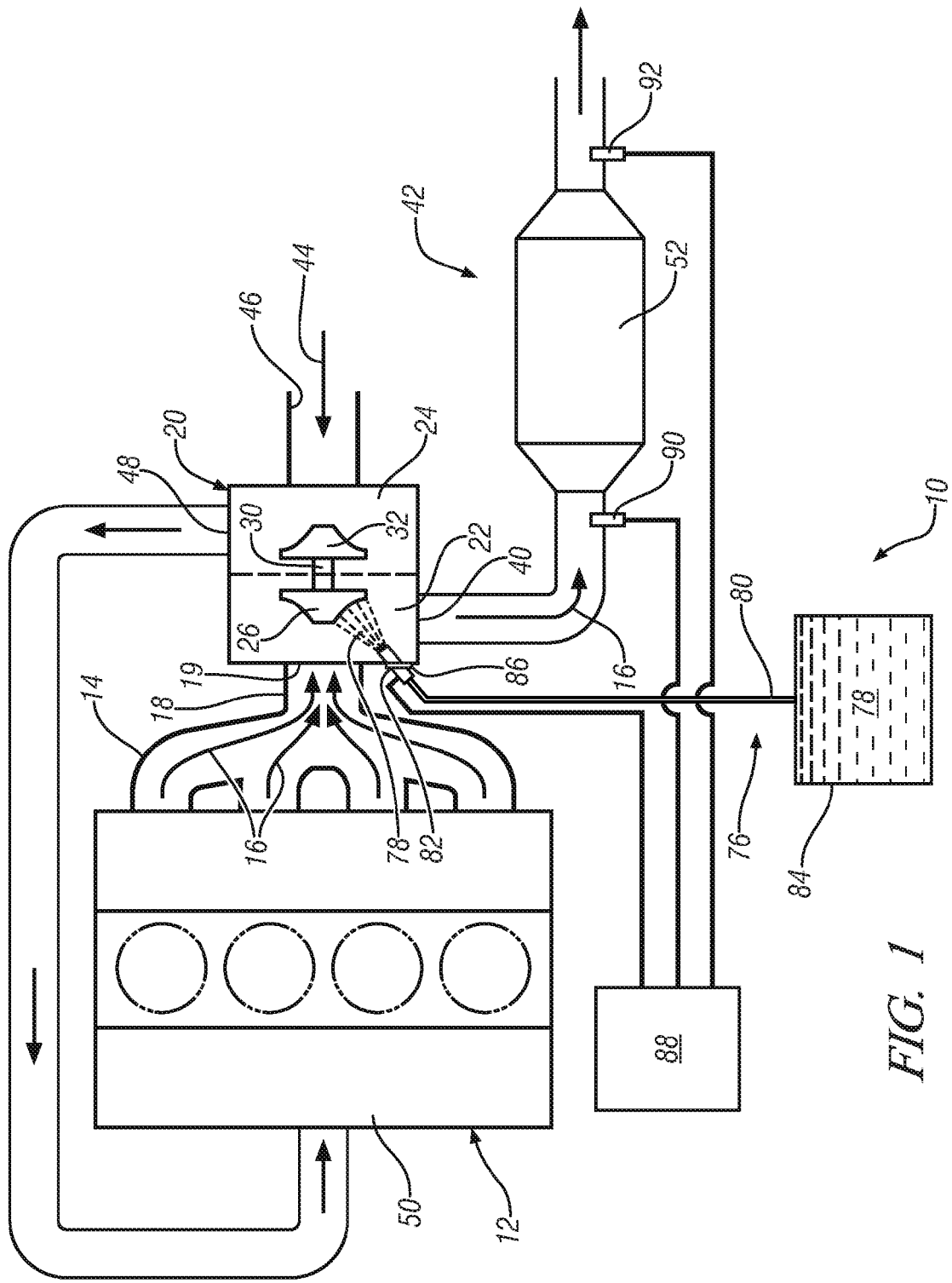
FIG. 1 is a schematic view of an internal combustion engine and associated exhaust treatment system.

The following description is merely exemplary in nature and is not intended to limit the present disclosure, application or uses. It should be understood that throughout the drawings, corresponding reference numerals indicate like or corresponding parts and features.

Referring to FIG. 1, an exemplary embodiment of the invention is directed to an exhaust treatment system 10 for the reduction or conversion of regulated exhaust constituents of an internal combustion engine, such as diesel engine 12. It is appreciated that the diesel engine 12 is merely exemplary in nature and that the invention described herein can be implemented in various engine systems which may include, but are not limited to, gasoline direct injection systems and homogeneous charge compression ignition engine systems. For ease of description and discussion, the disclosure will be discussed in the context of a diesel engine.

The exhaust treatment system 10 includes an exhaust manifold 14 associated with exhaust ports (not shown) of the engine 12. The exhaust manifold 14 fluidly connects the engine exhaust ports and combines the exhaust gas 16 exiting the engine 12 into a single exhaust flow. The exhaust manifold includes an outlet 18 that is coupled to a turbine inlet 19 of a turbocharger 20.

The turbocharger 20 includes a turbine housing 22 and a compressor housing 24. Disposed within the turbine housing 22 is a turbine wheel 26 which is mounted for rotation on a first end of turbocharger shaft 30. In a similar fashion, a compressor wheel 32 is rotatably mounted within the compressor housing 24 on the second end of the turbocharger shaft 30. The turbocharger shaft 30 is supported on bearings (not shown) which are disposed between, and connect, the turbine housing 22 with the compressor housing 24. A turbocharger exhaust gas outlet 40 is fluidly connected to an engine or vehicle exhaust system 42 which receives exhaust gas 16 exiting the turbine housing 22 of the turbocharger 20. Exhaust gas 16 from the exhaust manifold 14 enters the turbine housing 22 through turbine inlet 19. The energy of the exhaust gas 16 drives the turbine wheel 26, the turbocharger shaft 30 and the compressor wheel 32. As the compressor wheel rotates, ambient air 44 is drawn into the compressor housing 24 through compressor inlet 46 which may be connected to an upstream air intake system (not shown). The ambient air is compressed by the compressor wheel 32 and associated compressor housing 24 and exits the compressor outlet 48 for distribution to an intake manifold 50.

Figure 2:
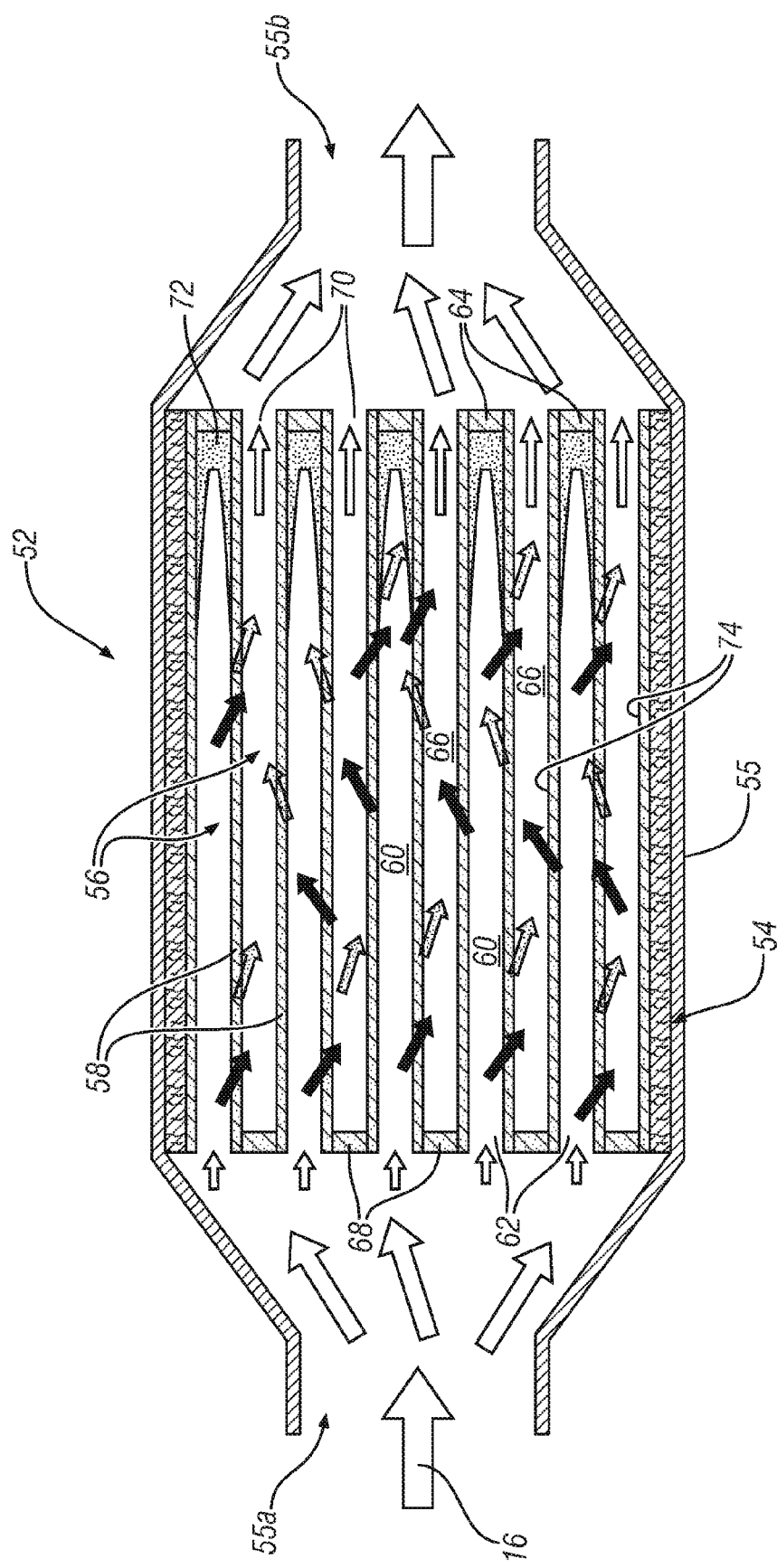
FIG. 2 is a sectional view of an exhaust treatment device of the exhaust treatment system of FIG. 1.

Referring to FIGS. 1 and 2, in an exemplary embodiment of the invention, the exhaust system 42 may include an exhaust treatment device such as the Selective Catalyst Reduction "SCR"/Diesel Particulate Filter "DPF" device 52. The SCR/DPF device 52 is configured to filter exhaust gas transiting the exhaust system 42 in order to remove carbon and other particulates, and to reduce the oxides of nitrogen ("$NO_x$") resident in the exhaust gas 16 through the use of one or more SCR catalysts. The SCR/DPF device 52 may be constructed with a ceramic wall flow monolith 54, FIG. 2, which is supported in a housing 55 having an inlet 55a that is fluidly connected to and receives exhaust gas 16 from the turbocharger exhaust gas outlet 40 and an outlet 55b through which exhaust gas exits the device. The ceramic wall flow monolith 54 includes a plurality of longitudinally extending passages 56 formed by longitudinally extending walls 58. The passages 56 include inlet passages 60 that have an open inlet end 62 and a closed outlet end 64, and outlet passages 66 that have a closed inlet end 68 and an open outlet end 70. Exhaust gas 16 entering the SCR/DPF device 52 through the open inlet end 62 of the inlet passages 60 is forced to migrate through the longitudinally extending walls 58 to the outlet passages 66. It is through this wall flow mechanism that the exhaust gas is filtered of carbon and other particulates 72.

The filtered particulates 72 are collected on the longitudinally extending walls 58 of the inlet passages 60 and will have the effect of increasing the exhaust system back pressure on the diesel engine 12 over time. To address backpressure increases caused by the accumulation of particulates 72, the SCR/DPF device 52 is periodically regenerated. Regeneration involves the combustion of the accumulated particulates 72 in what is typically a relatively high temperature (>600° C.) environment that may have the effect of increasing the levels of $NO_x$ in the exhaust gas 16.

In an exemplary embodiment of the exhaust treatment system 10, one or more SCR catalyst compositions 74 are applied to the longitudinally extending walls 58 of the ceramic wall flow monolith 54. An exemplary catalyst composition preferably contains a zeolite and one or more base metal components such as iron ("Fe"), cobalt ("Co"), copper ("Cu"), vanadium ("V") or any one of a combination thereof. The SCR catalyst composition(s) 74 are configured to reduce the levels of $NO_x$ resident in the exhaust gas 16 in the presence of an ammonia constituent. Referring again to FIG. 1, the SCR/DPF device 52 is located in a close, downstream position relative to the turbocharger exhaust gas outlet 40. Such a placement is typically referred to as "close coupling" and may be beneficial to the operation of the SCR/DPF device 52. As a result of the close coupling, a low thermal mass exists between the engine 12 and the SCR/DPF device 52. Lower thermal mass results in lower heat loss from the exhaust gas 16 thereby providing for quicker activation of the SCR catalyst composition 74 following a cold engine start, as well as reducing additional energy which must be supplied to bring the SCR/DPF device 52 to an adequate temperature for regeneration of filtered particulates 72.

In an exemplary embodiment, an $NH_3$ reductant injection system 76 includes a reductant supply 78, a conduit system 80 for transport of the ammonia reductant to a location in the exhaust system 42 that is upstream of the SCR/DPF device 52, and an injection device 82 coupled to the exhaust treatment system 10, and in fluid communication with the exhaust gas 16 for introduction of the $NH_3$ reductant thereto. The $NH_3$ supply 78 may be a liquid such as urea and is contained in a reductant tank 84. Other $NH_3$ supplies currently under consideration include gaseous and solid phase materials. In order to assure appropriate mixing and/or distribution of the reductant in the exhaust gas 16 in a close coupled application of the SCR/DPF device 52, the injection device 82, which may be a fluid or a gaseous injector is, in an exemplary embodiment of the invention, fluidly coupled to the turbine housing 22 and is configured to inject the reductant directly into the exhaust gas 16 passing therethrough. Such a configuration may include a mounting flange 86 formed in the turbine housing which is configured to sealingly support the injection device thereon. The rapidly spinning turbine wheel 26 (100,000-200,000 RPM) will function as an effective mixer or turbulator for the reductant 78 in the exhaust gas 16 assuring that the distribution of the reductant is adequate for proper functioning of the SCR catalyst when the exhaust gas enters the SCR/DPF device 52.

Figure 3:
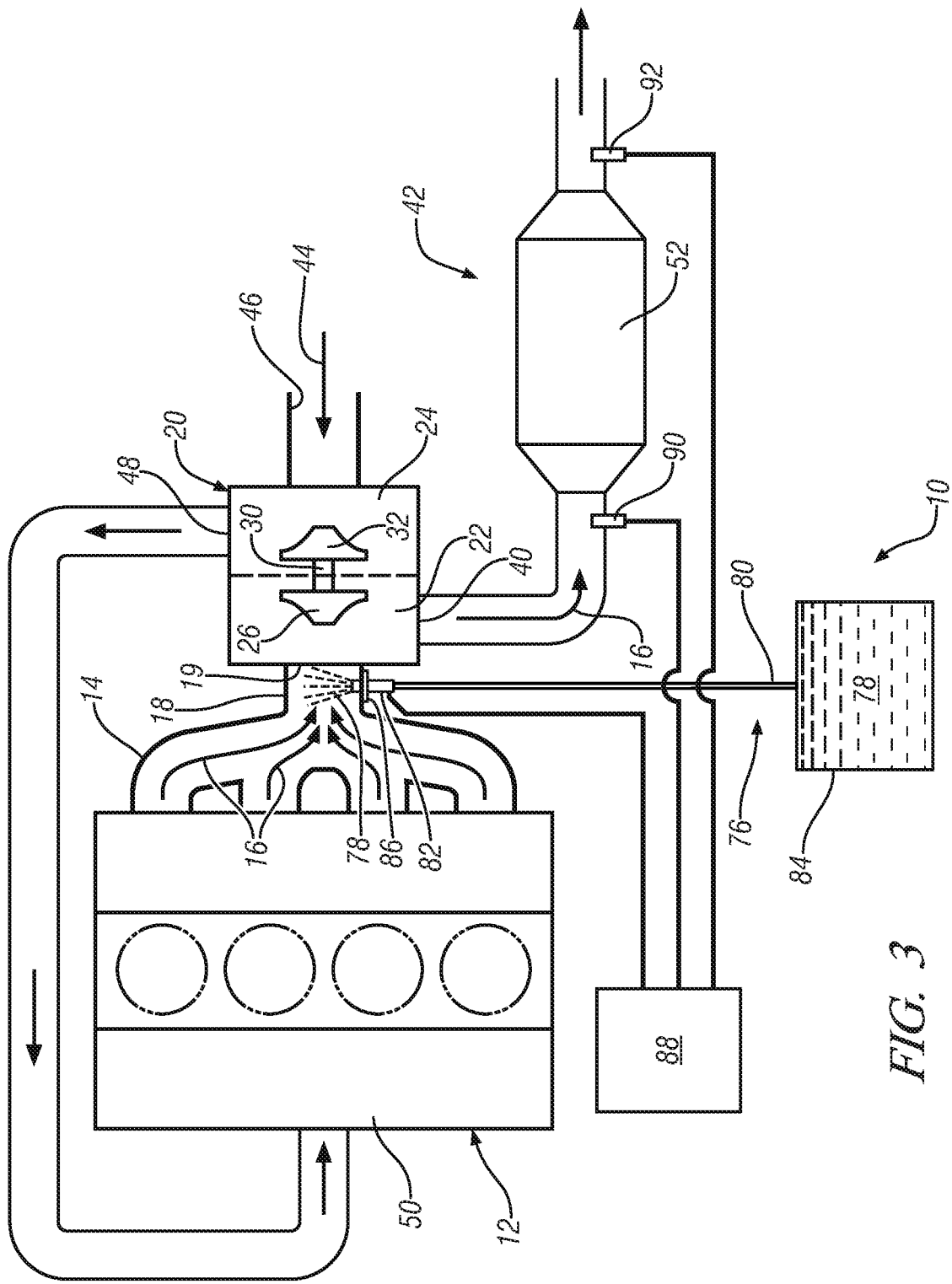
FIG. 3 is a schematic view of another embodiment of an internal combustion engine and associated exhaust treatment system

In another exemplary embodiment shown in FIG. 3, where like numbers indicate like features already described, in instances where modification of the turbine housing 22 is not feasible due to packaging, performance or cost constraints, the injection device 82 may be fluidly associated with the exhaust treatment system at a location adjacent to the turbine inlet 19. Such a configuration may include a mounting flange 86 formed in the exhaust manifold 14 at a location closely associated with the exhaust manifold outlet 18 which is configured to sealingly support the injection device 82 thereon. The injection device 82 is, as described above, configured to inject the reductant directly into the exhaust gas 16 passing through the exhaust manifold and into the turbocharger 20 where the rapidly spinning turbine wheel 26 (100,000-200,000 RPM) will function as an effective mixer or turbulator for the reductant 78 in the exhaust gas 16. Such a configuration will assure that the distribution of the reductant is adequate for proper functioning of the SCR catalyst when the exhaust gas enters the SCR/DPF device 52.

A controller, such as engine controller 88 may be utilized to actuate the injection device 82 to thereby deliver reductant 78 to the exhaust treatment system 10 based on signal information it receives from various sensors, such as $NO_x$ sensor 90 or temperature sensor 92. As used herein the term controller refers to an application specific integrated circuit (ASIC), an electronic circuit, a processor (shared, dedicated or group) and memory that executes one or more software of firmware programs, a combinational logic circuit, and/or other suitable components that provide the described functionality.

While the exhaust treatment system 10 has been primarily described with respect to an SCR catalyst composition 74 and associated SCR/DPF device 52 which requires the use of an ammonia based reductant 78, it is contemplated that other catalyst system configurations, such as oxidation catalysts, hydrocarbon selective catalyst reduction (HC-SCR) catalysts, or lean $NO_x$ trap (LNT) catalysts, or a combination thereof, which require the addition of a hydrocarbon or other chemical additive will equally benefit from the invention described herein. Additionally, while the internal combustion engine described above is a diesel engine, internal combustion engines which run on gasoline or other fuels may also benefit from the invention described herein and, therefore, the scope should is not limited to the embodiments used for descriptive purpose herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A reductant delivery system for an exhaust treatment system of an internal combustion engine comprising:
    a turbocharger fluidly coupled to, and configured to receive exhaust gas from, the internal combustion engine;
    an exhaust gas driven turbine wheel disposed for rotation in a turbine housing of the turbocharger;
    a reductant injection device coupled to and extending through the turbine housing, the reductant injection device in fluid communication with the turbine wheel of the turbocharger;
    a reductant storage tank; and
    a conduit system fluidly connecting the reductant injection device with reductant in the reductant storage tank for delivery of the reductant to the reductant injection device, and from the reductant injection device directly into the turbine housing of the turbocharger upstream from the exhaust gas driven turbine wheel disposed therein.

2. The reductant delivery system for an exhaust treatment system of an internal combustion engine of claim 1, wherein the reductant comprises ammonia or urea, or a combination thereof.

3. The reductant delivery system for an exhaust treatment system of an internal combustion engine of claim 1, wherein the reductant injection device comprises a liquid or gaseous injector.

4. An exhaust treatment system for an internal combustion engine comprising:
    an exhaust manifold mounted to the internal combustion engine and configured to collect exhaust gas from the internal combustion engine;
    a turbocharger fluidly coupled to the exhaust manifold and configured to receive the exhaust gas therefrom;
    an exhaust gas driven turbine wheel disposed for rotation in a turbine housing of the turbocharger;
    an exhaust treatment device located downstream of, and in fluid communication with, the turbocharger and configured to receive the exhaust gas from the turbocharger and to oxidize or reduce, or a combination thereof, constituents of the exhaust gas; and
    a reductant injection system coupled to the turbine housing, in fluid communication with the exhaust treatment system, and configured to inject a reductant into the exhaust gas within the turbine housing upstream of the turbine wheel, wherein the turbine wheel is configured to mix the reductant with the exhaust gas for delivery to the exhaust treatment device.

5. The exhaust treatment system for an internal combustion engine of claim 4, wherein the reductant injection system includes a reductant injector mounted to the turbine housing of the turbocharger for injection of the reductant into the turbocharger adjacent to the turbine wheel.

6. The exhaust treatment system for an internal combustion engine of claim 5, further comprising a flange formed in the turbine housing, wherein the reductant injector is sealingly supported on the flange.

7. The exhaust treatment system for an internal combustion engine of claim 6, wherein the reductant injector extends angularly into the turbine housing.

8. The exhaust treatment system for an internal combustion engine of claim 7, wherein the reductant injector is oriented at an angle such that the reductant is sprayed onto a lower portion of the turbine wheel.

9. The exhaust treatment system for an internal combustion engine of claim 8, wherein the exhaust treatment device is a selective catalytic reduction device and a diesel particulate filter device.

10. The exhaust treatment system for an internal combustion engine of claim 9, further comprising:
    an NOx sensor positioned between the turbocharger and the exhaust treatment device; and
    a temperature sensor positioned downstream of the exhaust treatment device.

11. The exhaust treatment system for an internal combustion engine of claim 4, wherein the exhaust treatment device further comprise:
    a ceramic monolith having longitudinally extending passages defined by longitudinally extending walls; and
    a catalyst composition disposed on the walls and operable with the reductant, to convert or reduce selected constituents of the exhaust gas.

12. The exhaust treatment system for an internal combustion engine of claim 11, wherein the catalyst composition comprises a zeolite and one or more base metal components such as iron ("Fe"), cobalt ("Co"), copper ("Cu"), vanadium ("V") or a combination thereof.

13. The exhaust treatment system for an internal combustion engine of claim 11, wherein the ceramic monolith is a wall flow monolith configured to filter particulate matter from the exhaust gas.

14. The exhaust treatment system for an internal combustion engine of claim 4, wherein the reductant comprises ammonia or urea, or a combination thereof.

15. A method for the reduction of exhaust gas constituents of an internal combustion engine comprising:
   collecting exhaust gas in an exhaust manifold;
   delivering the exhaust gas to a turbocharger in fluid communication with the exhaust manifold and having an exhaust gas driven turbine wheel disposed for rotation in a turbine housing of the turbocharger;
   selecting an exhaust treatment device,
   locating the exhaust treatment device downstream of, and in fluid communication with, the turbine housing of the turbocharger; and
   locating a reductant delivery device in the turbine housing of the turbocharger, upstream from, and in fluid communication with the turbine wheel disposed therein.

16. The method of claim 15, further comprising, activating the reductant delivery device to deliver a reductant to the turbine wheel of the turbocharger for mixing with the exhaust gas.

17. The method of claim 16, wherein activating the reductant delivery device comprises operating a fluid injector.

18. The method of claim 17, wherein operating the fluid injector comprises using a controller to actuate the opening and the closing of the fluid injector.

19. The method of claim 15, wherein selecting the exhaust treatment device comprises selecting at least one urea-selective catalyst reduction device, hydrocarbon-selective catalyst reduction device, lean $NO_x$ trap catalyst or oxidation catalyst, or a combination thereof.

20. The method of claim 15, wherein locating the reductant delivery device comprises attaching the reductant delivery device to the turbine housing of the turbocharger.

* * * * *